United States Patent [19]

Taylor

[11] 4,213,081

[45] Jul. 15, 1980

[54] METHOD AND APPARATUS FOR CHARGING SEALED NI-CAD BATTERIES

[76] Inventor: Earnest R. Taylor, P.O. Box 1254, Rosamond, Calif. 93560

[21] Appl. No.: 881,179

[22] Filed: Feb. 27, 1978

[51] Int. Cl.² ............................................. H02J 7/04
[52] U.S. Cl. ..................................... 320/40; 320/20; 328/132
[58] Field of Search ................. 320/39, 40, 2, DIG. 1; 328/132

[56] References Cited

U.S. PATENT DOCUMENTS

| | | | |
|---|---|---|---|
| 3,289,065 | 11/1966 | Dehmelt et al. | 320/40 |
| 3,794,905 | 2/1974 | Long | 320/39 X |
| 3,919,618 | 11/1975 | Coleman et al. | 320/DIG. 1 X |
| 3,938,021 | 2/1976 | Kosmin | 320/40 |
| 4,091,320 | 5/1978 | Foster | 320/40 |
| 4,118,661 | 10/1978 | Siekierski et al. | 328/132 X |
| 4,137,493 | 1/1979 | Smith | 328/132 X |

Primary Examiner—Robert J. Hickey
Attorney, Agent, or Firm—Christie, Parker & Hale

[57] ABSTRACT

A sealed nickel-cadmium battery having a voltage-charge characteristic with a single peak voltage value that is in the overcharge region is charged by applying a charging current to the battery while monitoring the battery terminal voltage, and terminating or substantially reducing the charging current when the battery terminal voltage reaches the peak value. Specifically, to determine when the terminal voltage of the battery reaches the peak value, the maximum value attained by the battery terminal voltage is stored on an ongoing basis while applying the charging current, and the stored maximum value is compared with the instantaneous value of the battery terminal voltage. When the stored value exceeds the instantaneous value, the peak value is indicated.

9 Claims, 3 Drawing Figures

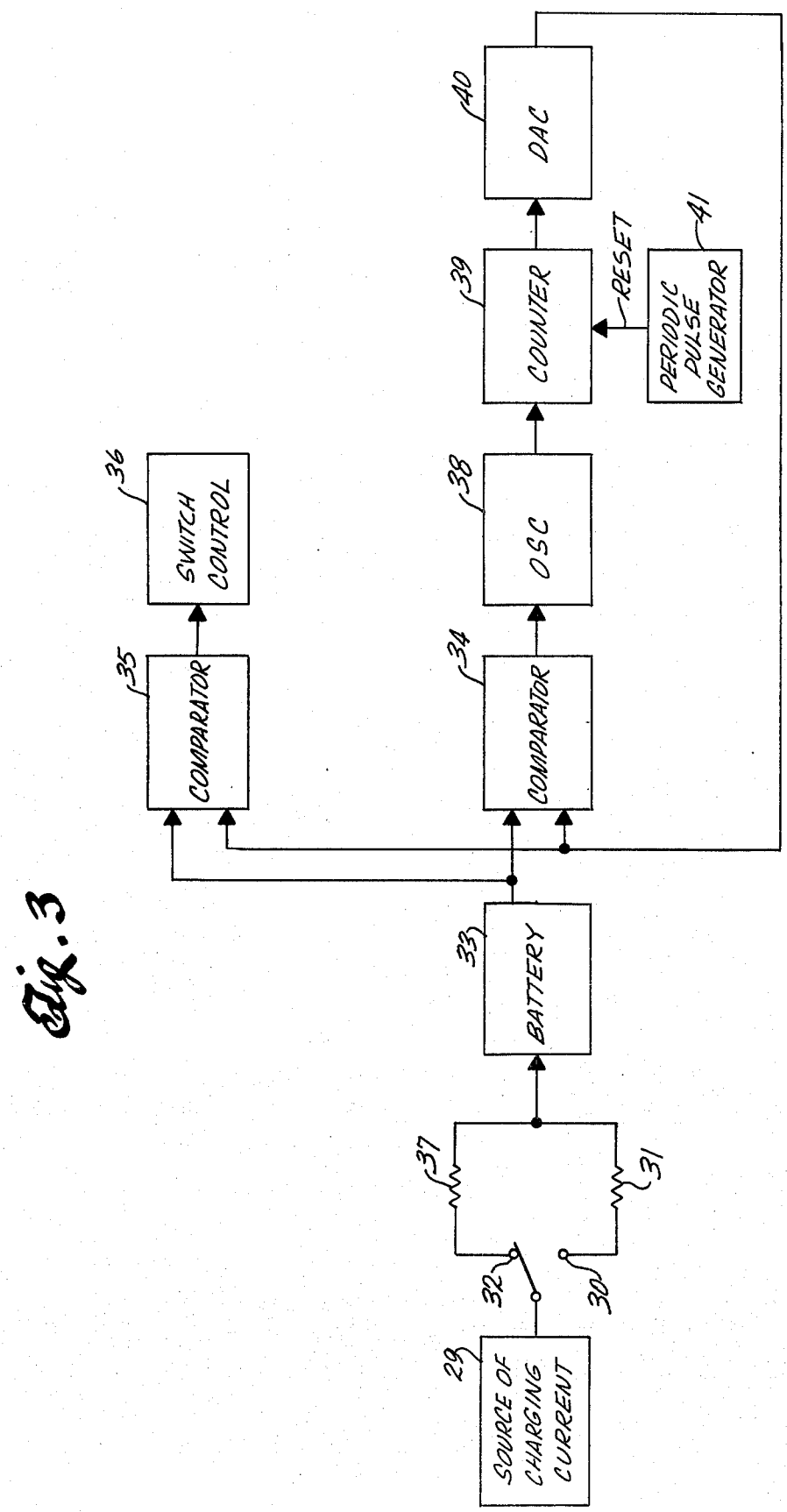

METHOD AND APPARATUS FOR CHARGING SEALED NI-CAD BATTERIES

BACKGROUND OF THE INVENTION

This invention relates to the field of electrical energy storage and, more particularly, to a method and apparatus for quick or fast charging sealed nickel-cadmium batteries without risk of battery damage.

Sealed nickel-cadmium batteries are widely used in industry and by consumers as a source of electrical energy because they are rechargeable and otherwise require no maintenance. The charging rate of a battery is normally expressed as a multiple of its capacity (C) in, for example, ampere-hours. In other words, a cell charged at the C rate in amperes will become fully charged in one hour.

Nickel-cadmium batteries are charged at widely different rates ranging from 0.01 C to 10 C or more. A charging rate of 0.01 C to 0.04 C, regarded as standby charging, is utilized to maintain a battery in its fully charged state after it has been charged at a faster rate. A charging rate of 0.05 C to 0.1 C, regarded as slow charging, is utilized to charge a discharged battery without charge control, because a slow charging current can be applied to any sealed nickel-cadmium battery for an indefinite period of time after a fully charged state has been reached without damaging the battery. Slow charging requires from ten to twenty hours to charge a fully discharged battery. A charging rate of 0.2 C to 0.3 C, regarded as quick charging, is utilized to charge specially designed sealed nickel-cadmium batteries without charge control, because these specially designed batteries are able to handle quick charging current in overcharge without excessive pressure buildup or temperature rise. Quick charging requires from three to five hours. A charging rate above 0.3 C up to and exceeding 10 C, regarded as fast charging, is generally utilized to charge sealed nickel-cadmium batteries only with charge control, because the pressure and temperature buildup resulting from a fast charging current in overcharge will destroy most batteries in a short time, unless the fast charging current is terminated. Fast charging requires one hour, or less. Specially designed sealed nickel-cadmium batteries that can be quick, or in some cases fast, charged without charge control are too expensive for many applications.

A number of battery parameters, namely, terminal voltage, internal pressure, and temperature, change as a function of the state of charge of a sealed nickel-cadmium battery. When charge control is provided for fast charging a sealed nickel-cadmium battery, one or more of these parameters is sensed to determine when the battery is fully charged and the charging current should be terminated. One method of charge control, involving so-called voltage cutoff (VCO), determines when the battery is in overcharge by sensing the rapid rise in battery terminal voltage as full battery charge is reached. Very accurate sensing and tight tolerances are required where control is based upon only one parameter. For example, it is difficult to sense the terminal voltage alone because the voltage-charge characteristic is temperature dependent, particularly the rate of rise and the peak voltage value. The most accurate technique to date for sensing when the battery is in overcharge, called voltage-temperature cutoff (VTCO), is based upon both battery temperature and terminal voltage. Great care must also be taken to properly match the resistances of the cells connected in series to form a battery. If the cells are mismatched, one or more cells may become damaged before the charge control terminates charging. The problems attendant upon accurately sensing when a nickel-cadmium battery is fully charged have raised the cost of fast charging systems to the point of precluding their use in many commercial and industrial products.

SUMMARY OF THE INVENTION

A sealed nickel-cadmium battery has a voltage-charge characteristic with a single peak terminal voltage value that is in the overcharge region. The invention is based upon the discovery that sealed nickel-cadmium batteries can be quick or fast charged to this peak voltage value without damaging the battery. Charge control is provided to sense when the battery terminal voltage reaches its peak value.

One aspect of the invention is a method for charging a sealed nickel-cadmium battery comprising the steps of applying a charging current to the battery, monitoring the terminal voltage of the battery, and terminating or substantially reducing the charging current when the battery terminal voltage begins to fall, which occurs immediately after the peak value of the battery terminal voltage has been reached. Thus, charge control is based on an unambiguous indication of a fully charged battery state, so a quick or fast charging current can be removed after the battery is fully charged but before it becomes damaged, irrespective of variations in the peak voltage value, or other ambiguous or interrelated charge indicative parameters, or mismatched cell resistance.

Another aspect of the invention is an electrical energy storage system comprising a sealed nickel-cadmium battery, a source of charging current, disconnectible circuitry for applying a large charging current from the source to the battery, circuitry for storing the maximum value attained by the battery terminal voltage on an ongoing basis, circuitry for comparing the stored maximum value with the instantaneous value of the terminal voltage, and circuitry for disconnecting the charging current applying circuitry when the instantaneous value of the terminal voltage is less than the stored maximum value thereof. Thus, the fully charged state of the battery can be sensed by relatively simple, straightforward, and cheap circuitry comprising readily available components.

BRIEF DESCRIPTION OF THE DRAWINGS

The features of specific embodiments of the best mode contemplated of carrying out the invention are illustrated in the drawings, in which:

FIG. 3 is a schematic block diagram of another electrical storage system incorporating the principles of the invention.

DETAILED DESCRIPTION OF THE SPECIFIC EMBODIMENTS

Figure 1:
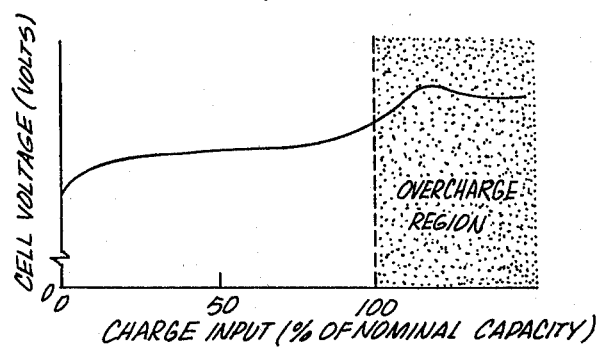
FIG. 1 is a graph of a typical voltage-charge characteristic of a sealed nickel-cadmium battery during fast charging.

As depicted by the voltage-charge characteristic of FIG. 1, the terminal voltage of a nickel-cadmium cell during charging from a fully discharged state first rises rapidly from the discharged state to a plateau value, and thereafter rises slowly over the remaining charging period, until the cell goes into overcharge. Then, the terminal voltage again rises, this time very rapidly, until it reaches a peak voltage value well into the overcharge region; after the peak value, the terminal voltage immediately drops slowly to a slightly lower equilibrium level. In the overcharge region, there is a buildup of temperature and pressure within the cell. According to the invention, it has been discovered that sealed nickel-cadmium cells can be quick or fast charged up to the peak voltage value in the overcharge region without excessive buildup of internal temperature or pressure, i.e., without causing cell damage. FIG. 1 illustrates that a sealed nickel-cadmium battery has a voltage-charge characteristic with a single peak voltage value that is in the overcharge region. In the preferred embodiments of the invention described below, a charging current applied to a sealed nickel-cadmium battery is terminated or substantially reduced when the terminal voltage of the battery reaches the peak value of the voltage-charge characteristic, irrespective of any other battery parameters. The occurrence of a peak value, as distinguished from the magnitude of this peak value, internal pressure, temperature, or charging time, provides an unambiguous, reliable indication that the battery has attained its fully charged state, even when the battery comprises cells having greatly mismatched resistances. When the occurrence of the peak value is accurately sensed and the charging current thereafter promptly terminated or reduced, no battery damage occurs.

Figure 2:
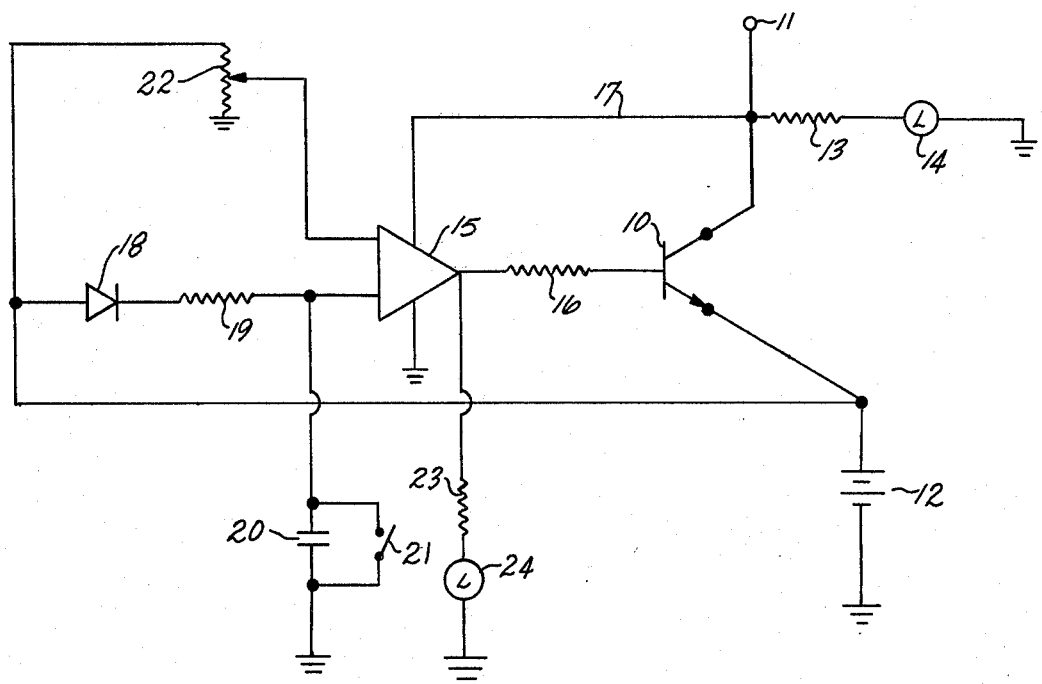
FIG. 2 is a schematic circuit diagram of one embodiment of an electrical energy storage system incorporating the principles of the invention.

In FIG. 2, a source of charging current comprises an NPN power transistor 10. The collector of transistor 10 is connected to a voltage supply terminal 11, and the emitter of transistor 10 is connected to the positive terminal of a sealed nickel-cadmium battery 12 comprising one or more cells. The negative terminal of battery 12 is grounded. The positive terminal of a direct current voltage source, such as an automobile battery or a rectifier, is connected to terminal 11, and the other terminal of such source is grounded. The voltage source produces a steady or pulsating voltage larger than the maximum, i.e., fully charged, terminal voltage of battery 12. A resistor 13 and a lamp 14 are connected in series between the collector of transistor 10 and ground to indicate when power is supplied to terminal 11. When power is supplied to terminal 11, lamp 14 is on; otherwise it is off.

Charge control is provided by an FET operational amplifier 15 together with transistor 10. Operational amplifier 15, which has a binary output depending upon which of its inputs is at a higher potential, serves as a comparator. Amplifier 15 has an output connected by a resistor 16 to the base of transistor 10. The resistance of resistor 16 determines the charging rate of battery 12. The larger the desired charging rate, the smaller the resistance of resistor 16. Preferably, charging occurs at a fast charging rate to minimize charge time. Power from terminal 11 is supplied to operational amplifier 15 by a lead 17. A diode 18, a resistor 19, and a capacitor 20 are connected in series across the terminals of battery 12. As shown, diode 18 is poled to conduct battery current to capacitor 20. A reset switch 21, which could comprise a pushbutton switch, is connected in parallel with capacitor 20. The junction of resistor 19 and capacitor 20 is connected to a first input of operational amplifier 15. The end terminals of a potentiometer 22 are connected across the terminals of battery 12, and the slider arm of potentiometer 22 is connected to a second input of operational amplifier 15. This connection is noncapacitive in the sense that negligible capacitance, stray or otherwise, is in parallel with the second input of amplifier 15. This permits it to follow small instantaneous changes in battery terminal voltage. Potentiometer 22 is set so the voltage applied to the second input of operational amplifier 15 is slightly higher or larger than the voltage applied to the first input of operational amplifier 15, e.g., typically 10 mv/cell, while the terminal voltage of battery 12 is constant or increasing. This, in essence, sets the noise margin of the charge control circuitry and additionally compensates for the voltage drop across diode 18 and any internal offset of operational amplifier 15. In such case, a positive voltage appears at the output of operational amplifier 15 to forward bias transistor 10, thereby causing a charging current to flow from terminal 11 to the positive terminal of battery 12.

In operation, after power is supplied to terminal 11, switch 21 is first closed to discharge capacitor 20. Thereafter, transistor 10 is forward biased by amplifier 15 to charge battery 12. Capacitor 20 charges rapidly to the value of the terminal voltage of battery 12, and the voltage across capacitor 20 follows the terminal voltage of battery 12 as it increases during charging. When the terminal voltage of battery 12 begins to fall after reaching its peak value in the overcharge region, the voltage at the first input of amplifier 15 becomes larger than the voltage at its second input, because diode 18 blocks discharge of capacitor 20, and the output of operational amplifier 15 becomes grounded. (It should be noted that discharge of capacitor 20 through the first input of operational amplifier 15 is prevented by the extremely high input impedance provided by an FET operational amplifier.) As a result of the grounding of the output of amplifier 15, transistor 10 cuts off, thereby terminating the charging current to battery 12. A resistor 23 and a lamp 24 are connected in series between the output of operational amplifier 15 and ground to indicate when battery 12 is being charged. When the lamp goes out charging is terminated.

In summary, capacitor 20 stores the maximum value of the battery terminal voltage on an ongoing basis. The instantaneous value of the battery terminal voltage is applied to the second input of amplifier 15, where it is compared with the stored maximum value applied to the first input. When the instantaneous value drops below the stored maximum value, amplifier 15 terminates battery charging through transistor 10.

Transistor 10 serves two functions, namely, as a switch to terminate the charging of battery 12 when a fully charged state is sensed, and, with the voltage source connected to terminal 11, as a source of charging current for battery 12. In the latter function, transistor 10 controls the charging current in an advantageous manner. Specifically, for most of the charging interval, with reference to FIG. 1, the initial rapidly rising period and the plateau where the battery terminal voltage rises slowly, transistor 10 serves to supply approximately constant current to battery 12. At the end of the charging interval, with reference to FIG. 1, the period of rapidly rising battery terminal voltage before the peak voltage value, the current supplied by transistor 10 to battery 12, drops somewhat because of the rise in battery terminal voltage, e.g., from 1.2 amps to 0.9 amps, in anticipation of charge termination. This current drop reduces further the likelihood of battery damage due to overcharging.

To provide a small sustaining charge to battery 12 after a fully charged state is reached, a resistor would be connected from terminal 11 to the base of transistor 10 to raise the base to a positive potential after the output of amplifier 15 becomes grounded.

Typical component values and types for the circuitry of FIG. 2 are as follows: transistor 10—type 2N3055; operational amplifier 15—National Semiconductor LM0022H; diode 18—type 1N4001; capacitor 20—1000 μf; resistor 13—2000 ohms; resistor 16—1000 ohms; resistor 19—10,000 ohms; resistor 23—2000 ohms; and potentiometer 22—500,000 ohms.

In the embodiment of FIG. 3, a fully charged battery state is sensed digitally. The output of a source of charging current 29 is connected by a normally closed switch contact 30 and a small resistor 31 to a battery 33 to be charged. The terminal voltage of battery 33 is applied to a first input of a comparator 34 and a comparator 35. The output of comparator 35 is coupled to a switch control 36, such as a relay coil, for opening switch contact 32 and closing a switch contact 30, which is coupled to battery 33 by a small resistor 31. The output of comparator 34 is coupled to the control input of a pulsed oscillator 38. Oscillator 38 drives a binary counter 39. A digital-to-analog converter (DAC) 40, converts the binary count registered by counter 39 to an analog signal, which is applied to a second input of comparator 34 and comparator 35. The output of a periodic pulse generator 41, which generates one or two pulses per minute, is applied to a reset input of counter 39. When the first input of comparator 34 is larger than its second input by a predetermined amount, e.g., 10 mv/cell of the battery, its output is energized. When the first input of comparator 34 is not larger than the second input by this predetermined amount, the output is not energized. Oscillator 38 generates oscillations only while its control input is energized by the output of comparator 34. Counter 39 counts the oscillations of oscillator 38. When the first input of comparator 35 is larger than its second input, the output is energized and when its second input is larger than its first input, the output is deenergized.

In operation, when battery 33 is connected to the charging and charge control circuitry as shown in FIG. 3, the output of comparator 35 is energized and a quick or fast charging current is applied by source 29 to battery 33 through switch contact 30. The magnitude of the charging current is determined by the resistance of resistor 31. The output of comparator 34 remains energized and oscillator 38 supplies oscillations to counter 39 until the output of converter 40 equals the terminal voltage of battery 33, minus the predetermined amount. Thus, as battery 33 charges and its terminal voltage rises, the count registered by counter 39 follows the terminal voltage of battery 33. When the terminal voltage of battery 33 drops by the predetermined amount after reaching its peak value, the output of comparator 35 is deenergized to deactuate switch control 36, which closes switch contact 32. This establishes a small charge sustaining current to battery 33, the magnitude of which is determined by the resistance of resistor 37. Pulse generator 41 resets counter 39 once or twice a minute to prevent the possibility of noise causing counter 39 to register a count larger than the peak voltage value of battery 33, which would prevent termination of quick or fast charging when the battery is fully charged.

In the embodiment of FIG. 3, comparator 34, oscillator 38, counter 39, converter 40, and pulse generator 41 serve to store the maximum voltage value of battery 33 in analagous fashion to capacitor 20 in the embodiment of FIG. 2; comparator 35 performs the function of operational amplifier 15 in the embodiment of FIG. 2; and switch contacts 32 and 30 with switch control 36 perform the charge terminating function of transistor 10 in the embodiment of FIG. 2.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention. For example, the peak voltage value of the battery being charged could be sensed by a differentiator and a zero crossing detector, or the invention could be carried out with a microprocessor. The voltage peak sensing according to the invention could be combined with sensing of other charge determinative parameters to terminate charging, although this has not been found to be necessary to avoid battery damage. Further, the invention can be used to charge at any rate, slow or fast, although best advantage thereof can be made by quick or fast charging. Many nickel-cadmium batteries have been charged at a one C rate by means of the invention without experiencing damage. Some batteries have also been charged at a two or three C rate by means of the invention; no battery damage has been experienced at this higher rate. It is believed that substantially higher charging rates, e.g., up to ten C, or more, can be employed in the invention without battery damage.

It is well known that nickel-cadmium batteries exhibit a memory effect when repeatedly charged and discharged under uniform conditions. The invention erases, so to speak, any memory effect that may be built up in a nickel-cadmium battery, which permits batteries that may have been discarded as spent to be rejuvenated and returned to their original charge capacity.

What is claimed is:
1. An electrical energy storage system comprising:
   a sealed nickel-cadmium battery having first and second terminals;
   a source of charging current;
   disconnectable means for applying a large charging current from the source to the battery;
   a diode and a capacitor connected in series between the first and second terminals of the battery, the diode being connected to the first terminal and the capacitor being connected to the second terminal to form therebetween a junction, the diode being poled to charge the capacitor as the battery voltage increases;
   comparing means having first and second inputs;
   means for connecting the junction to the first input of the comparing means;
   a connection from the first terminal of the battery to the second input of the comparing means including means for compensating for the voltage drop across the diode; and
   means responsive to the comparing means for disconnecting the applying means when the voltage at the second input drops below the voltage at the first input.

2. The system of claim 1, additionally comprising connectable means for applying a small sustaining charging current from the source to the battery, and means responsive to the comparing means for connecting the small current applying means when the large current applying means is disconnected.

3. The system of claim 1, additionally comprising a normally open manually operated discharge switch connected across the capacitor.

4. The system of claim 1, in which the second input of the comparator is set higher than the first input of the comparator.

5. The system of claim 1, in which the compensating means comprises a potentiometer.

6. Charging apparatus for a sealed nickel-cadmium battery having a terminal voltage comprising:
   a source of charging current;
   disconnectable means for applying a large charging current from the source to the battery;
   means for storing the maximum value attained by the battery terminal voltage on an ongoing basis, the storing means comprising a pulsed oscillator, means for counting the oscillations of the oscillator, means for converting the counted oscillations to an analog signal, and means for actuating the oscillator as long as the analog signal is less than the battery terminal voltge to cause the counted oscillations to follow the maximum value of the terminal voltage of the battery;
   means for comparing the stored maximum value with the instantaneous value of the terminal voltage, the comparing means comprising a comparator having a first input to which the analog signal is applied and a second input to which the battery terminal voltage is applied; and
   means responsive to the comparing means for disconnecting the applying means when the instantaneous value of the terminal voltage is less than the stored maximum value of the terminal voltage.

7. The system of claim 6, in which the counting means comprises a resettable binary counter, the system additionally comprising means for periodically resetting the counter.

8. An electrical energy storage system comprising:
   a sealed nickel-cadmium battery having first and second terminals;
   a source of charging voltage;
   a transistor having a collector connected to the source of charging voltage, an emitter connected to the first terminal of the battery, and a base;
   a diode and a capacitor connected in series between the first and second terminals of the battery, the diode being connected to one terminal and the capacitor being connected to the other terminal to form a junction therebetween, the diode being poled to charge the capacitor when the battery voltage is increasing;
   a comparator having first and second inputs and an output connected to the base of the transistor, the output of the comparator causing the transistor to cut off when the voltage applied to the second input drops below the voltage applied to the first input;
   means for connecting the junction to the first input; and
   means for connecting the one terminal of the battery to the second input.

9. The system of claim 8, in which the means for connecting the one terminal of the battery to the second input comprises a potentiometer set to compensate for the voltage drop across the diode.

* * * * *